United States Patent
Yamanaka et al.

(10) Patent No.: US 8,386,817 B2
(45) Date of Patent: Feb. 26, 2013

(54) INFORMATION PROCESSING UNIT, POWER-SAVING MANAGEMENT PROGRAM, AND STORAGE MEDIUM STORED WITH THE POWER-SAVING MANAGEMENT PROGRAM

(75) Inventors: Yasuhiro Yamanaka, Chiba (JP); Fumiaki Hisamatsu, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 521 days.

(21) Appl. No.: 12/576,155

(22) Filed: Oct. 8, 2009

(65) Prior Publication Data

US 2010/0095144 A1 Apr. 15, 2010

(30) Foreign Application Priority Data

Oct. 14, 2008 (JP) ................... 2008-265791

(51) Int. Cl.
*G06F 1/00* (2006.01)
*G06F 1/32* (2006.01)
(52) U.S. Cl. ......... 713/320; 713/300; 713/323; 709/217
(58) Field of Classification Search .................. 713/300, 713/320, 323; 709/217
See application file for complete search history.

(56) References Cited

U.S. PATENT DOCUMENTS

| 7,925,248 | B2 * | 4/2011 | Aoki et al. ..................... 455/418 |
| 2007/0058074 | A1 * | 3/2007 | Yamagishi ..................... 348/372 |

FOREIGN PATENT DOCUMENTS

| JP | 2002-182805 | 6/2002 |
| JP | 2003-099160 | 4/2003 |
| JP | 2004-185050 | 7/2004 |

OTHER PUBLICATIONS

Japanese Patent Office; Notification of Reasons for Refusal issued in corresponding Japanese Patent Application No. 2008-265791, mailed Aug. 17, 2012, 5 pages (includes English translation).

* cited by examiner

*Primary Examiner* — Kim Huynh
*Assistant Examiner* — Michael J Brown
(74) *Attorney, Agent, or Firm* — Fitch, Even, Tabin & Flannery, LLP

(57) ABSTRACT

An information processing unit having an auto power-off function includes: a mode setting means for setting one mode from a plurality of pre-prepared power-saving modes in conformity with input by a user, wherein the plurality of power-saving modes includes a first mode and a second mode, and the first mode and the second mode differ in electricity consumption reduction effectiveness; a determination means for determining whether a non-operated state in which no input operation has been carried out by the user has continued for a predetermined time or longer; a processing execution means for executing internal processing; and a decision means for deciding whether or not to execute the auto power-off function based on the mode set by the mode setting means and internal processing executed by the processing execution means when the determination means has determined that the non-operated state has continued for a predetermined time or longer. A storage medium stores a computer program for power-saving management. A power-saving management method includes a mode setting step, a determination step, a processing execution step, and a decision step.

6 Claims, 6 Drawing Sheets

FIG. 6

Power-on/off when a predetermined period has elapsed without timer cancelation requirements occurring even once during power-on in first power-saving mode and second power-saving mode

| Internal processing of console main unit | First power-saving mode | Second power-saving mode |
|---|---|---|
| (1) During game application execution | Power-on continuation | Power-off |
| (2) During video/music/slideshow playback | Power-on continuation | Power-off |
| (3) During video chat | Power-on continuation | Power-off |
| (4) While printing | Power-on continuation | Power-off |
| (5) During standby for remote play | Power-on continuation | Power-off |
| (6) During sole standby for video chat | Power-off | Power-off |
| (7) During pause of video/music/slideshow | Power-off | Power-off |
| (8) During single photo display | Power-off | Power-off |
| (9) During browser execution | Power-off | Power-off |
| (10) During background download | Power-off | Power-off |
| (11) During foreground download | Power-on continuation | Power-on continuation |
| (12) While installing/updating | Power-on continuation | Power-on continuation |
| (13) While copying/deleting | Power-on continuation | Power-on continuation |
| (14) While formatting/backing up/restoring | Power-on continuation | Power-on continuation |
| (15) While broadcast program recording | Power-on continuation | Power-on continuation |
| (16) During remote play execution | Power-on continuation | Power-on continuation |

(1) ~ (10): Power-off
(11) ~ (15): Power-on continuation

FIG. 7

Timer cancellation requirements

| |
|---|
| (1) Reception of a command signal corresponding to any of the operation keys from the controller |
| (2) Change in detected value from the tilt sensor |
| (3) Reception of a command signal from the keyboard/mouse |
| (4) Detection of operation of the eject button of an external medium |
| (5) Detection of insertion of an external medium |
| (6) In first power-saving mode or second power-saving mode, elapse of a predetermined period without the timer cancelation requirements (1) to (5) occurring even once during power-on, and continuation of power-on when the predetermined period has elapsed |

FIG. 8

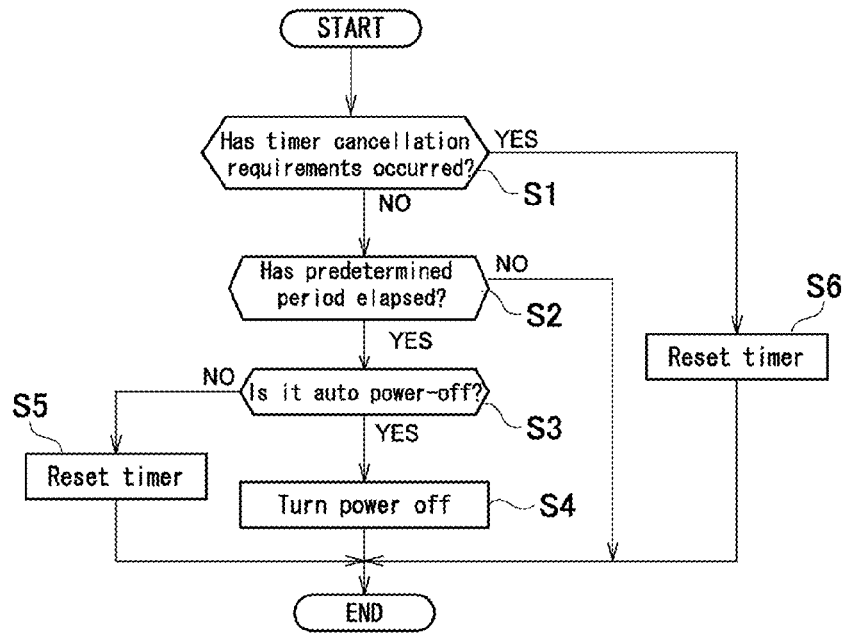

INFORMATION PROCESSING UNIT, POWER-SAVING MANAGEMENT PROGRAM, AND STORAGE MEDIUM STORED WITH THE POWER-SAVING MANAGEMENT PROGRAM

CROSS REFERENCE TO RELATED APPLICATION

The present application claims priority from Japanese Patent Application No. 2008-265791, filed on Oct. 14, 2008, the entire disclosure of which is hereby incorporated by reference herein in its entirety.

BACKGROUND OF THE INVENTION

1. Field of the Invention

The present invention relates to an information processing unit, a power-saving management program, and a storage medium stored with the power-saving management program.

2. Related Background Art

An information processing unit having an auto power-off function which may be set by changing the auto power-off time is well-known. See, for example, Japanese Unexamined Patent Application Publication No. 2003-99160.

SUMMARY OF THE INVENTION

Some embodiments of the present invention provide an information processing unit having an auto power-off function. The information processing unit includes a power-saving mode setting means for setting one mode from a plurality of pre-prepared power-saving modes in conformity with input by a user, wherein the plurality of power-saving modes includes a first mode and a second mode, and the first mode and the second mode differ in electricity consumption reduction effectiveness; a non-operation continued time determination means for determining whether a non-operated state in which no input operation has been carried out by the user has continued for a predetermined time or longer; a processing execution means for executing internal processing; and an auto power-off decision means for deciding whether or not to execute the auto power-off function based on the mode set by the mode setting means and internal processing executed by the processing execution means when the determination means has determined that the non-operated state has continued for a predetermined time or longer.

Another embodiment provides an information processing unit having an auto power-off function, comprising: a mode setting means for setting one mode from a plurality of pre-prepared power-saving modes in conformity with input by a user, wherein the plurality of power-saving modes includes a first mode and a second mode, and the first mode and the second mode differ in electricity consumption reduction effectiveness; a determination means for determining whether a non-operated state in which no input operation has been carried out by the user has continued for a predetermined time or longer; a processing execution means for executing internal processing; and a decision means for deciding whether or not to execute the auto power-off function based on the mode set by the mode setting means and internal processing executed by the processing execution means when the determination means has determined that the non-operated state has continued for a predetermined time or longer.

Another embodiment provides a storage medium storing a computer program for power-saving management, wherein the computer program allows a computer to execute: a mode setting step of setting one mode from a plurality of pre-prepared power-saving modes in conformity with input by a user, wherein the plurality of power-saving modes includes a first mode and a second mode, and the first mode and the second mode differ in electricity consumption reduction effectiveness; a determination step of determining whether a non-operated state in which no input operation has been carried out by the user has continued for a predetermined time or longer; a processing execution step of executing internal processing; and a decision step for deciding whether or not to execute the auto power-off function based on the mode set in the mode setting step and internal processing executed in the processing execution step when the non-operated state is determined in the determination step to have continued for a predetermined time or longer.

And another embodiment provides a power-saving management method, comprising: a mode setting step of setting one mode from a plurality of pre-prepared power-saving modes in conformity with input by a user, wherein the plurality of power-saving modes includes a first mode and a second mode, and the first mode and the second mode differ in electricity consumption reduction effectiveness; a determination step of determining whether a non-operated state in which no input operation has been carried out by the user has continued for a predetermined time or longer; a processing execution step of executing internal processing; and a decision step for deciding whether or not to execute the auto power-off function based on the mode set in the mode setting step and internal processing executed in the processing execution step when the non-operated state is determined in the determination step to have continued for a predetermined time or longer.

BRIEF DESCRIPTION OF THE DRAWINGS

FIG. 6 is a table showing correspondence among each internal processing executed by the console main unit, types of power saving modes, power status, which is set when a predetermined time has elapsed without the timer cancellation requirements generating even once during power-on;

FIG. 7 is a table showing contents of timer cancellation requirements; and

FIG. 8 is a flowchart showing power-saving management processing.

DESCRIPTION OF THE PREFERRED EMBODIMENTS

Figure 1:
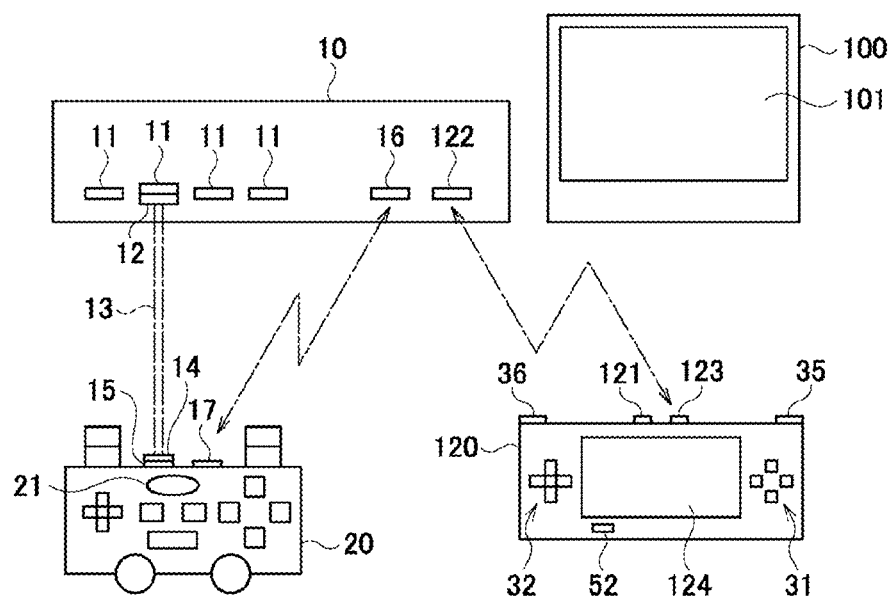
FIG. 1 is a diagram schematically showing an entertainment system of an embodiment of the present invention.

Various users' demands for the auto power-off function are different. For example, whether or not to want the auto power-off function to be enabled while the same internal processing is being executed by an information processing unit varies according to individual users. This is an example of a problem to be solved by some embodiments of the present invention. There is provided herein one or more embodiments and/or means that may be used for solving such problem.

Some embodiments of the present invention aim to provide an information processing unit capable of executing an auto power-off function on demand from individual users through a simple operation input. In some embodiments of the present invention, a simple operation input by an individual user allows execution of an auto power-off function on demand. This is an example of a result that may be achieved by some embodiments of the present invention.

Thus, in some embodiments an information processing unit or apparatus, which is capable of executing an auto power-off function on demand by individual users through a simple operation input, is provided. In some embodiments, a console main unit 10 having an auto power-off function is set to one mode from a plurality of pre-prepared power-saving modes, which include a first mode and a second mode differing in electricity consumption reduction effectiveness, in conformity with setting input by a user. When a non-operated state in which no input operation has been carried out by the user is determined to have continued for a predetermined time or longer, a main CPU 64 of the console main unit 10 decides whether or not to execute the auto power-off function based on the set mode and executed internal processing.

[Description Of Reference Numerals]

10: entertainment console (console main unit); 20: controller; 64: main CPU; 65: main memory; 120: portable operation terminal.

[General Structure of the Embodiment]

An entertainment system according to an embodiment of the present invention shown in FIG. 1 includes an entertainment console (hereafter referred to as console main unit) 10, which is an exemplary video game console of an information processing unit or apparatus according to the present invention, and a controller 20, which is an operation terminal operated by a user (player). Information is transmitted and received through communication between the console main unit 10 and the controller 20. The user may arbitrarily select either communication therebetween by a wired connection via a USB connecting cable 13 or by a wireless connection. Moreover, when a wired connection is established between the console main unit 10 and the controller 20, the wired communication takes priority over the wireless communication and is always conducted except for a boot process described later whereas no wireless communication is conducted.

In the example of FIG. 1, the console main unit 10 has multiple controller ports 11. For wirelessly connecting the controller 20 and the console main unit 10, the USB connecting cable 13 has a plug-in connector 12 provided on an end inserted into an arbitrary one of the controller ports 11 of the console main unit 10 and electrically connected, and a plug-in connector 14 provided on the other end inserted into a connection port 15 of the controller 20 and electrically connected. The wired connection method used between the console main unit 10 and the controller 20 should allow two-way communications, and a universal serial bus (USB) connection (hereafter referred to as USB connection) is adopted in this embodiment.

Furthermore, the controller 20 is provided with a wireless communication unit (antenna) 17 for sending and receiving information through wireless communication between the console maim unit 10 and a wireless communication unit (antenna) 16. There are various communication methods applicable between the wireless communication units 16 and 17 such as a general purpose short-range, high-speed wireless communication method such as Bluetooth™ or an exclusive short-range, wireless communication method as long as two-way wireless communication is possible therebetween. Bluetooth™ wireless communication (hereafter referred to as BT communication) is used in this embodiment.

With this entertainment system, instead of or in addition to the controller 20, a portable terminal apparatus 120 may be used as an operation terminal operated by a user. Moreover, wired or wireless connections of a keyboard and/or a mouse to the console main unit 10 are possible, and the keyboard and the mouse may be used as operation terminals.

The portable terminal apparatus 120 is provided with a connection port 121 for sending and receiving information through a wired connection with the controller port 11 of the console main unit 10, and a wireless communication unit (antenna) 123 for sending and receiving information through wireless communication between the console main unit 10 and a wireless communication unit (antenna) 112. Either communication by a wired connection or by a wireless connection may be arbitrarily selected for connection between the console main unit 10 and the portable terminal apparatus 120. The wired connection method used between the console main unit 10 and the portable terminal apparatus 120 should allow two-way communications, and a USB connection is adopted in this embodiment. For wirelessly connecting the portable terminal apparatus 120 and the console main unit 10, the USB connecting cable 13 has a plug-in connector 12 provided on an end inserted into an arbitrary one of the controller ports 11 of the console main unit 10 and electrically connected, and a plug-in connector 14 provided on the other end inserted into the connection port 121 of the portable terminal apparatus 120 and electrically connected. Moreover, there are various communication methods applicable between both wireless communication units 122 and 123 such as a general purpose short-range, high-speed wireless communication method such as wireless LAN and an exclusive short-range, wireless communication method as long as two-way wireless communication is possible therebetween. IEEE 802.11 wireless communication (hereafter referred to as wireless LAN communication) is adopted in this embodiment. Note that operating the console main unit through wireless LAN communication using the portable terminal apparatus 120 is called remote play in the following description.

Figure 2:
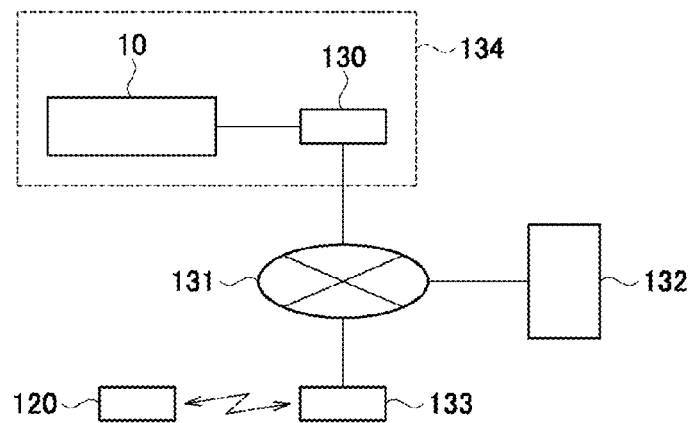
FIG. 2 is a diagram schematically showing a network to which a console main unit is connected.

As shown in FIG. 2, the console main unit 10 is connected to the Internet 131 via a relay unit (e.g., a terminal adaptor or router) 130, and sends and receives information through two-way communication with an external server 132 and the like via the Internet 131. Moreover, two-way communication between the portable terminal apparatus 120 and the console main unit 10 is possible through wireless LAN communication between the portable terminal apparatus 120 and a wireless LAN access point 133 connected to the Internet 131. For example, a user who has left a building 134 in which the console main unit 10 is installed may perform remote play by connecting the portable terminal apparatus 120 to the console main unit 10 via the access point 133, which is available away from the building, the Internet 131, and the relay unit 130.

[Overall Structure of Entertainment System]

The entertainment system shown in FIG. 1 is constituted by the console main unit 10, the controller 20, and a monitor device (e.g., television receiver) 100 to which images and audio signals are supplied from the console main unit 10. The monitor device 100 has an image display unit 101 for displaying the images based on the audio signals supplied from the console main unit 10.

[General Description of Console Main Unit]

In addition to the above-mentioned controller ports 11 and the wireless communication units 16 and 122, the console main unit 10 is provided with a memory card slot in which a memory card may be inserted/ejected, a disk tray, an open/close button (eject button) for opening and closing the disk tray, an on/standby/reset button for turning power-on, into standby mode, or reset, an audio-video output terminal (AV multi-output terminal), a PC card slot, an optical digital output terminal, an IEEE (Institute of Electrical and Electronics Engineers) 1394 connection terminal, a power switch, and an AC power input terminal not shown in the drawing.

The console main unit 10 is set to either an on state (complete activated state) or an off state. The off state includes normal off states (standby state and sleep state) and complete off state (complete stop state), and the console main unit 10 is set to any one of the three states: on state, normal off state, and complete off state. Note that in the following description, changing from the normal off state to the on state is called activation.

By operating a power switch, the console main unit 10 is switched over from the on state to the complete off state. The console main unit 10 in the on state is switched over from the on state to the normal off state by operating an on/standby/reset button. Note that in the following description, the on state is called power-on, and the normal off state is called power-off.

Switching between power-on and power-off of the console main unit 10 is also possible by operation input from the controller 20. For example, when the state of the console main unit 10 is in power-on, it is switched over to power-off by operating the controller 20 to display a menu screen on the monitor device 100 and select and determine an item of 'turn off main unit power' within the menu. Moreover, when the state of the console main unit 10 is in power-off, it is activated by depressing a start button 53 (shown in FIG. 2) described later of the controller 20.

Meanwhile, even if the portable terminal apparatus 120 transmits an activate request signal for switching over the console main unit 10 from power-off to power-on, a certain model of the relay unit 130 may not transmit that active request signal to the console main unit 10. When such a model of the relay unit 130 is connected to the console main unit 10, and if the console main unit 10 is switched over from power-on to power-off through remote play, the console main unit 10 may not be activated through remote play. This is inconvenient for the user performing remote play away from the building. Therefore, switching over the console main unit 10 from power-on to power-off through remote play is prohibited.

The console main unit 10 has functions of executing various internal processing such as game application execution, video/music/slide show playback, single photo display, video chatting, printing, browser execution, background download, foreground download, program download and upload, data copy and deletion, format, backup, and restoration of internal memory such as HDD, and broadcast program recording.

In game application execution, a video game is executed in conformity with an input operation by the user based on a video game program stored in various storage media (hereinafter simply referred to as storage media) such as internal memory such as HDD, for example, disk medium such as a DVD-ROM or CD-ROM, other tangible storage media, etc. In video/music playback, video data and audio data stored on a storage medium is reproduced (decoded). In slideshow playback, static image data stored in the storage medium is changed over every predetermined time and displayed on the monitor device 100. In printing, a print control signal is output to a printer (omitted from the drawings) connected to the console main unit 10 so as for the printer to perform printing. In single photo display, static image data stored in the storage medium is displayed on the monitor device 100. In video chatting, video and sound input from a camera and microphone (omitted from the drawings) connected to the console main unit 10 are transmitted and received to/from a terminal device of a communication partner (e.g., another entertainment console) via the Internet 131 so as to conduct a conversation between the user of the terminal console 10 and the communication partner. In background and foreground download, data is downloaded by an external server 132 via the Internet 131, for example. In background download, when the console main unit 10 is switched over from power-on to power-off in the middle of downloading, the downloading is temporarily interrupted, and is restarted upon reactivation of the console main unit 10. On the other hand, in foreground download, when the console main unit 10 is switched over from power-on to power-off in the middle of downloading, the downloading is ended in the middle, and is not restarted even if the console main unit 10 is reactivated. Note that whether downloading is carried out either in the foreground or the background is determined according to input operation by the user. In broadcast program recording, a broadcast program received via a broadcasting reception cable (omitted from the drawings) is recorded based on an application program for broadcast program recording. The application program for broadcast program recording is a program for a reserve and record function, which reserves and records a desired program by pre-storing recording start and end times and recording channel, for example.

Note that the above-mentioned application program and video/audio data are read from not only disk media but also from semiconductor memory and tape media. It may also be supplied from a wired or wireless wide-area or intra-area communication line (e.g., the Internet 131).

Moreover, the console main unit 10 has an auto power-off function, selectively being set to either a normal mode (non-power-saving mode) or a power-saving mode (auto power-off mode), which allows reduction in electricity consumption, in conformity with a setting input by the user. In the power-saving mode, power-on is forcibly switched over to power-off (auto power-off) when a predetermined period has elapsed during power-on without timer cancellation requirements described later occurring even once. Meanwhile, in the normal mode, power-on is maintained regardless of occurrence of the timer cancellation requirements.

The power-saving mode includes two modes: a first power-saving mode and a second power-saving mode, which differ in electricity consumption reduction effectiveness. The console main unit 10 is selectively set to either of the power-saving modes in conformity with a setting input by the user. Namely, the user may appropriately set to one of the three modes regarding electricity consumption: the normal mode, the first power-saving mode, and the second power-saving mode.

The first power-saving mode is a mode allowing both reduction of electricity consumption and convenience for the user, and the second power-saving mode is a mode giving top priority to reduction in electricity consumption. The various types of internal processing executed by the console main unit 10 are classified into the following four groups according to setting of the first power-saving mode and the second power-saving mode. The first group includes internal processing which has little possibility of a defect occurring with the console main unit 10, and little decrease in convenience for the user even if it is switched over to power-off while executing the internal processing. The second group includes internal processing which has little possibility of a defect occurring with the console main unit 10 even if it is switched over to power-off while executing the internal processing, but convenience for the user decreases. The third group includes internal processing which has a high possibility of a defect occurring with the console main unit 10 or convenience for the user decreases remarkably when it is switched over to power-off while executing the internal processing. The fourth group includes internal processing not belonging to any of the first to the third groups.

In the first power-saving mode, when a predetermined period has elapsed without timer cancellation requirements occurring even once during power-on, the auto power-off function becomes effective and switches over to power-off while the internal processing of the first group are executed; on the other hand the auto power-off function becomes ineffective and power-on is maintained while the internal processing of the second and the third group are executed. Moreover, in the second power-saving mode, when a predetermined period has elapsed without timer cancellation requirements occurring even once during power-on, the auto power-off function becomes effective and switches over to power-off while the internal processing of the first and the second group are executed; on the other hand the auto power-off function becomes ineffective and power-on is maintained while the internal processing of the third group are executed. In other words, the first power-saving mode has better convenience for the user than the second power-saving mode, and the second power-saving mode has greater reduction in electricity consumption than the first power-saving mode. In the case of the fourth group, it is switched over to power-off in conformity with the respective internal processing.

Note that while the internal processing is classified into three basic groups (first to third groups) and an additional fourth group and a second stage power-saving mode is provided with this embodiment, the internal processing may be classified into four or more basic groups, and three or more power-saving modes may be provided. Various methods for classification of the internal processing into four or more basic groups are available, such as, for example, dividing the influence of power-off on convenience for the user into three or more stages, dividing the influence of power-off on the console main unit 10 into three or more stages, or combining other judgment factors.

Moreover, switching the console main unit 10 (main CPU 64 described later) over to power-off while the application program is being executed is carried out after termination processing for the application program. For example, switching over to power-off while the application program is being executed is carried out after termination processing such as storing data for saving the state of the game application at the time of switch-over.

[Exterior of Controller]

Figure 3:
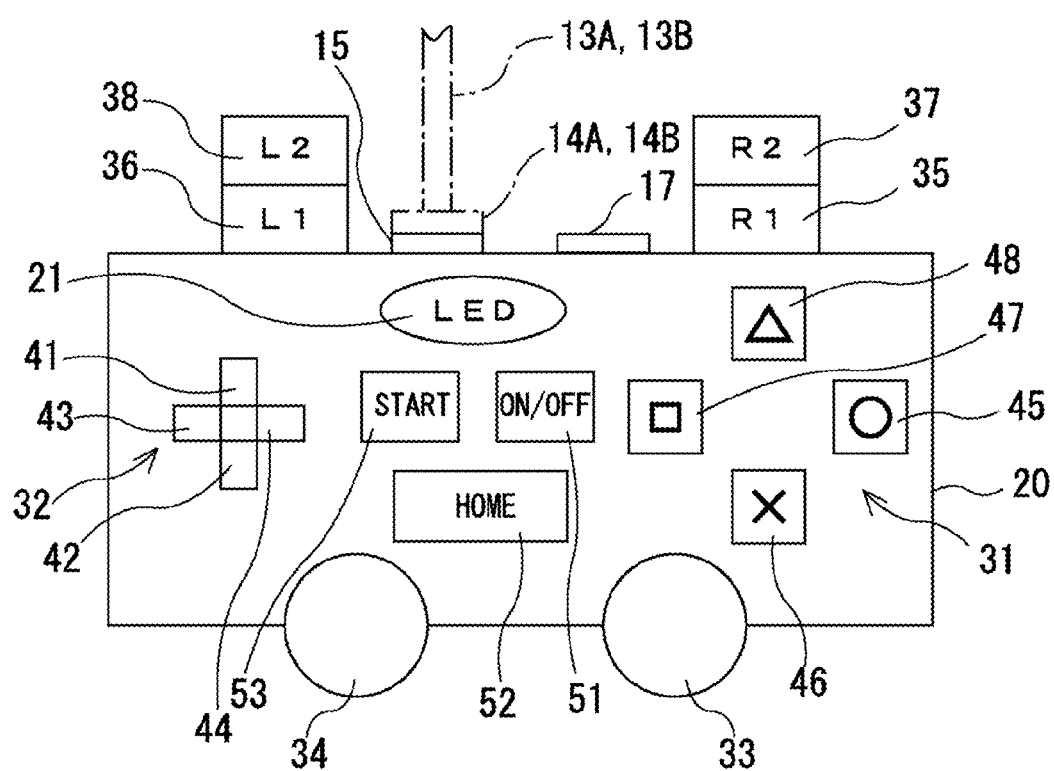
FIG. 3 is a diagram schematically showing an external structure of a controller.

The exterior of the controller 20 is briefly described with reference to FIG. 3.

The controller 20 includes the above-mentioned connection port 15 for USB connection with the console main unit 10, the above-mentioned wireless communication unit 17 for BT communication with the console main unit 10, and the display unit 21.

The controller 20 is provided with a right operation part 31 and a left operation part 32 respectively operable by the user's right and left thumbs when the user is gripping the controller 20 in the right and left hands, a right analog operation part 33 and a left analog operation part 34 respectively capable of analog operation also by the right and left thumbs, a first right push button 35 and a first left push button 36 respectively pushed by the right and left index fingers, and a second right push button 37 and a second left push button 38 respectively pushed by the right and left middle fingers.

The left operation part 32 is provided with an up command button 41, a down command button 42, a left command button 43, and a right command button 44 used when the user performs a manipulation such as moving the game character on the screen, for example. Furthermore, the right operation part 31 is provided with first through fourth operation buttons 45 to 48 to which are assigned different functions according to the game application such as setting or executing a function of a game character, for example.

The above-mentioned analog operation parts 33 and 34 are respectively provided with a right and a left rotational operation part (omitted from the drawing), which can rotate 360 degrees around an operational axis and return to a neutral position by a flexible member when not in operation, and a signal generator (omitted from the drawing), which generates signal in conformity with operation of these right and left rotational operation parts. The signal generator generates rotation angle signals indicating rotation positions (rotation angles) of the rotational operation parts around the operational axis, and tilting angle signals indicating tilting angles of the rotational operation parts from the neutral position.

The above-mentioned analog operation parts 33 and 34 are used by rotating the right and left rotational operation parts for moving the game characters while rotating or while varying speed, and for entering command signals for analog movements such as changing form.

Moreover, the controller 20 has an on/off button 51, a home button 52, and a start button 53.

The on/off button 51 is to be pressed to change the power source of the controller 20 between an on state and an off state, where the controller 20 in the off state changes to the on state by depression of the on/off button 51.

The home button 52 is to be pressed to start communication with the console main unit 10, and to make the console main unit 10 start processing for displaying a menu screen on an image display unit 101. Displaying the menu screen by the console main unit 10 is performed by priority by interrupting other running application programs. Furthermore, the menu screen is displayed even when the home button 52 is depressed, starting communication between the controller 20 and the console main unit 10.

The start button 53 is to be pressed to activate the console main unit 10 in power-off so as to switch over to power-on. Note that another button other than the start button 53 may be pressed to activate the console main unit 10 in power-off so as to switch over to power-on.

The display unit 21 is, for example, a liquid crystal display panel, an organic or inorganic electroluminescence (EL) panel, a segment display, or a light-emitting diode (LED) that the user can see.

[Internal Circuit Structure of Console Main Unit]

Figure 4:
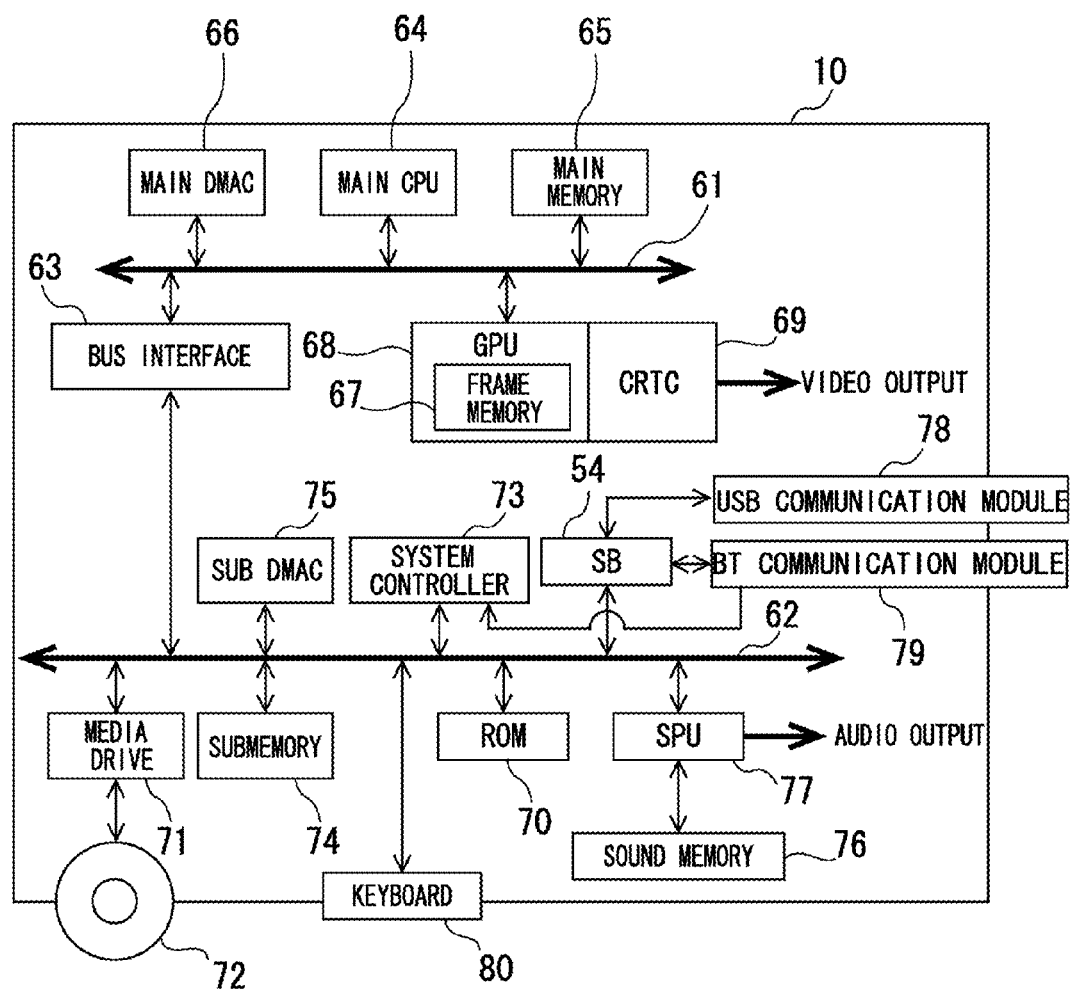
FIG. 4 is a block diagram showing the inner structure of the console main unit.

FIG. 4 shows a main internal structure of the console main unit 10.

As shown in FIG. 4, the console main unit 10 has a main bus 61 and a sub-bus 62, which are either connected or disconnected from each other via a bus interface 63.

A main CPU 64, volatile main memory 65 constituted by DRAM, a main direct memory access controller (DMAC) 66, and a graphic processing unit (GPU) 68 including frame memory 67 are connected to the main bus 61. A CRT controller (CRTC) 69, which is a control means for generating video output signals, is connected to the GPU 68. An image according to video output signals is displayed on a predetermined display unit (the image display unit 101 of the monitor device 100 in this embodiment) connected to the console main unit 10 via a cable or the like.

The main CPU 64 reads a boot program from ROM 70 on the sub-bus 62 via the bus interface 63 when the console main unit 10 starts running, executes that boot program, and then runs an operating system. It then reads out various programs including a configuration program for main unit functions and a power saving management program from the main memory 65 on the main bus 61. The configuration program for main unit functions includes a power-saving mode setting program. Moreover, the main CPU 64 controls a media drive 71, reads the application program or data from a medium 72 loaded into the media drive 71, and stores it in the main memory 65. Furthermore, geometric processing is carried out for various types of data read out from the medium 72, such as three-dimensional object data (coordinate values of a polygon vertex (representative point)) constituted by multiple basic figures (polygons). A display list including contents of polygon definition information is generated through the geometric processing. Moreover, data compressed using the moving picture experts group (MPEG) method or the joint photographic experts group (JPEG) method is decompressed. In other words, the main CPU 64 has an information deciphering function for deciphering information using software.

The polygon definition information includes drawing area setting information and polygon information. The drawing area setting information includes offset coordinates relative to the frame buffer address of a drawing area and coordinates in a drawing clipping area for canceling drawing when coordinates of a polygon exist outside of the drawing area. The polygon information includes polygon attribute information and vertex information; wherein the polygon attribute information includes information specifying shading mode, a blending mode, texture mapping mode, and the like, and vertex information includes information of coordinates within the vertex drawing area, coordinates within a vertex texture area, and vertex color.

The GPU 68 is stored with drawing contexts, reads out an appropriate drawing context based on image context identification information included in the display list informed from the main CPU 64, renders based thereupon, and draws a polygon in the frame memory 67. The frame memory 67 may also be used as texture memory, and thus a pixel image in the frame memory 67 may be applied to the polygon drawn as texture.

The main DMAC 66 controls DMA transfer for respective circuits connected to the main bus 61, and controls DMA transfer for respective circuits connected to the sub-bus 62 in conformity with status of the bus interface 63.

A USB connection controller ID registration table and a BT connection controller ID registration table for registering unique IDs for the controllers 20 are preset in the main memory 65. Transmission and reception of information to/from the controllers 20, which correspond to unique IDs registered in the USB connection controller ID registration table, through communication by a USB connection is possible, and transmission and reception of information to/from the controllers 20, which correspond to the unique IDs registered in the BT connection controller ID registration table, through communication by a BT connection is possible. Here, the state (logical layer connection state) allowing transmission and reception of information to/from the controllers 20 is one which allows the console main unit 10 to receive from the controller 20 information corresponding to the operation input by the user when the user has operated the aforementioned various types of input buttons 33, 34, 35 to 38, 41 to 48, and 51 to 53 of the controller 20, and then recognize which controller 20 sent the received information, and which allows the main CPU 64 to execute predetermined processing in conformity with the received information. Moreover, a standby time storage region and a mode type storage region are prepared in the main memory 65. Standby time (time that the console main unit 10 continues to be power-on as long as an instruction to switch over to power-off is not input by the user) set by the user is stored in the standby time storage region. Mode type information corresponding to type of mode (any one of normal mode, first power-saving mode, or second power-saving mode) set by the user is stored in the mode type storage region.

A system controller 73 constituted by a microprocessor or the like, a nonvolatile sub-memory 74 constituted by flash memory or the like, a sub-DMAC 75, the ROM 70 stored with programs such as an operating program, a sound processing unit (SPU) 77, which reads out sound data stored in sound memory 76 and outputs it as audio output, a south bridge (SB) 54 constituted by a group of circuits managing delivery of data among a USB communication module 78, a BT communication module 79, and other components (e.g., the system controller 72 or the sub-memory 74), a media drive 71 for loading a predetermined medium 72, and a keyboard 80 are connected to the sub-bus 62. The medium 72 is a storage medium such as a CD-ROM or DVD-ROM or other tangible storage medium stored with an image processing program. The console main unit 10 reads this image processing program to execute necessary entertainment processing. The USB communication module 78 includes the controller ports 11 (shown in FIG. 1), and transmits and receives information to/from the controller 20 via the USB connecting cable 13 through wired communication. The BT communication module 79 includes the wireless communication unit 16 (shown in FIG. 1), and transmits and receives information to/from the controller 20 through BT wireless communication.

The system controller 73 carries out various operations including the boot process described later in conformity with the program stored in the ROM 70. Moreover, the system controller 73 bypasses the south bridge 54, directly connecting to the BT communication module 79. As a result, even if the south bridge 54 is stopped during power-off, when the BT communication module 79 receives a physical layer connection request signal from the controller 20, this physical layer connection request signal is transmitted to the system controller 73. The sub-DMAC 75 controls DMA transfer for respective circuits connected to the sub-bus 62 only when the bus interface 63 has disconnected the main bus 61 from the sub-bus 62.

With power-off, only the system controller 73 and the BT communication module 79 are activated, and the other components such as the main CPU 64 are stopped. In this state, the BT communication module 79 may receive a physical layer connection request signal from the controller 20. Moreover, when the console main unit 10 in power-off receives an instruction to switch over to power-on, the system controller 73 starts the boot process of activating suspended components such as the main CPU 64. In the boot process, the main CPU 64 reads a boot program from ROM 70 on the sub-bus 62 via the bus interface 63, executes that boot program, and then runs an operating system. It then sequentially reads out programs such as a BT driver, a USB driver, and a controller connection management program from the main memory 65 on the main bus 61. The programs read in and run by the CPU at the time of the boot process are preset, and by running all of the preset programs, activation of the main CPU 64 is completed. Moreover, in the boot process, the USB communication module 78 and the south bridge 54 are activated before activation of the main CPU 64 begins. Furthermore, the main CPU 64 reads in and runs the controller connection management program after reading in and running the BT driver and the USB driver.

Moreover, once the BT communication module 79 receives the physical layer connection request signal from the controller 20, it transmits a physical layer connection enabling signal to the controller 20, establishing a state allowing inter-logical layer transmission and reception of data to/from the controller 20 through wireless communication.

[Internal Structure of Controller]

Figure 5:
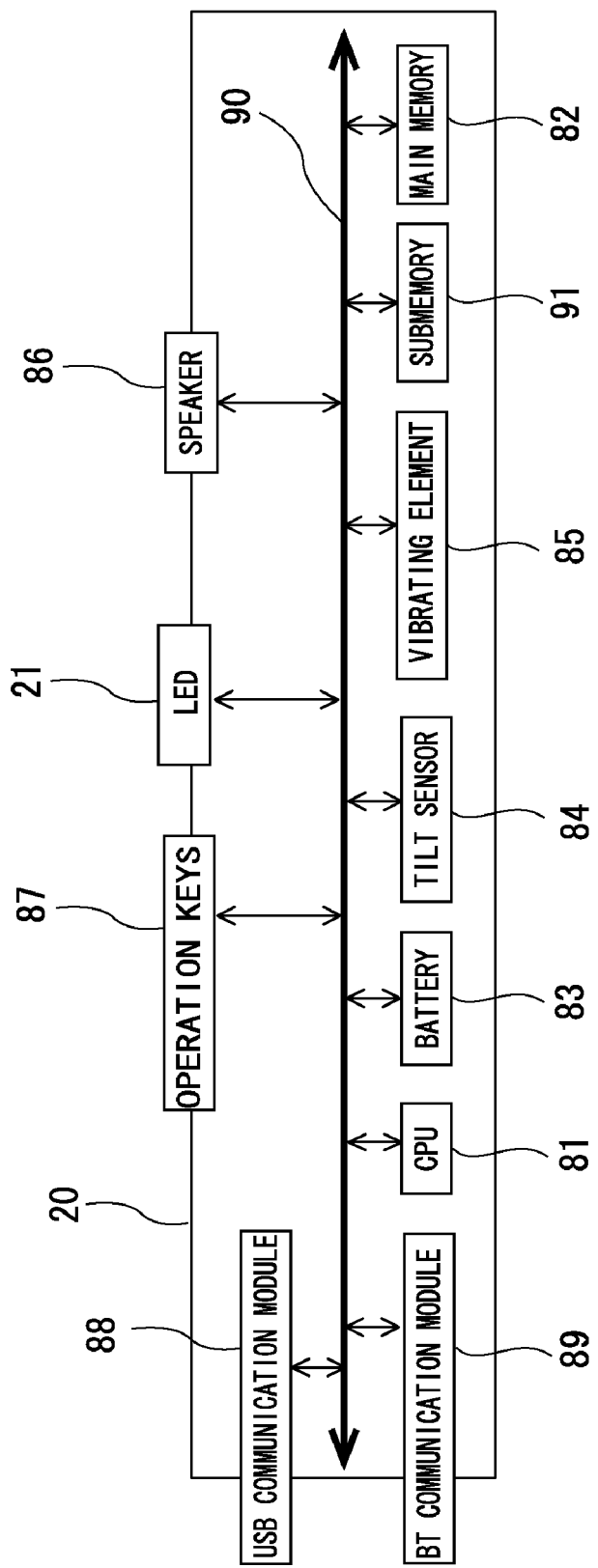
FIG. 5 is a block diagram showing the inner structure of the controller.

FIG. 5 shows a main internal structure of the controller 20.

In FIG. 5, the controller 20 has a CPU 81, nonvolatile main memory 82 constituted by DRAM, a battery 83, a tilting sensor 84, a vibrating element 85, a speaker 86, operation keys 87, the display unit (segment display or LED) 21, a USB communication module 88, a BT communication module 89, and nonvolatile sub-memory 91 constituted by flash memory or the like, which are connected via a bus 90. The operation keys 87 refer collectively to the above-mentioned various types of input buttons 33, 34, 35 to 38, 41 to 48, and 51 to 53 provided on the controller 20.

The CPU 81 reads a boot program in from the sub-memory 91 when activating the controller 20 and then executes the boot program. Moreover, the CPU 81 performs display control for keeping the display unit 21 in a predetermined light emitting status, audio control for controlling audio output to the speaker 86, and vibration control for providing vibration to the controller 20 by driving the vibrating element 85.

Furthermore, once the home button 52 or the start button 53 is depressed, the CPU 81 generates a physical layer connection request signal and transmits it to the console main unit 10 from the BT communication module 89.

The USB communication module 88 transmits and receives information to/from the console main unit 10 via the USB connecting cable 13 through wired communication while the BT communication module 89 wirelessly transmits and receives information to/from the console main unit 10 through BT communication. The USB communication module 88 includes the connection port 15 (shown in FIG. 1) while the BT communication module 89 includes a wireless communication unit 17 (shown in FIG. 1). Only one of the connection port 15 of the USB communication module 88 and the wireless communication unit 17 of the BT communication module 89 may be selectively used as a communication path, and which communication path is to be used is set by the CPU 81. Basically, in the state where the controller 20 and the console main unit 10 are connected by the USB connecting cable 13, the USB communication module 88 is selected and set as the communication path.

However, even in the state where the controller 20 and the console main unit 10 are connected by the USB connecting cable 13, the BT communication module 89 is selected and set as the communication path when the start button 53 is depressed. Then, once a wireless connection completion is established between the BT communication module 89 and the console main unit 10, the CPU 81 switches the communication path over from the BT communication module 89 to the USB communication module 88. In this manner, even when the USB connecting cable 13 is connected thereto, the BT communication module 89 is set as the communication path. This is because there is a high possibility that the console main unit 10 is power-off when the start button 53 is depressed, and transmission and reception of data through USB communication is thus impossible until the USB communication module 78 is activated or the main CPU 64 completes reading in and running the USB driver while the console main unit 10 is power-off. Once a wireless connection completion is established between the BT communication module 89 and the console main unit 10, this means activation of the USB communication module 78 and read in and running of the USB driver by the main CPU 64 are completed, and USB communication is available.

Moreover, the sub-memory 91 is pre-stored with a unique ID as terminal identification information uniquely given to each controller 20. The CPU 81 reads out a unique ID from the sub-memory 91 at a predetermined timing, and transmits the unique ID to the console main unit 10 from either the USB communication module 88 or the BT communication module 89.

Furthermore, the CPU 81 generates a preset command signal in conformity with an operation input to the operation keys 87 by the user, and transmits the generated command signal to the console main unit 10 from the USB communication module 88 or the BT communication module 89. More specifically, when the home button 52 and at least one of the other input buttons 33, 34, 35 to 38, 41 to 48, and 53 are depressed at the same time, the CPU 81 transmits to the console main unit 10 a specific processing execution command signal corresponding to the depressed button combination. Note that when the analog operation parts 33 and 34 are operated, the CPU 81 transmits the rotation angle signals and the tilting angle signals generated by the signal generator.

Note that the USB connecting cable 13 (shown in FIG. 1) connecting the controller 20 to the console main unit 10 includes a power line, and with a USB connection status, the console main unit 10 supplies power to the controller 20 via the power line, thereby charging the battery 83.

The tilting sensor 92 is constituted by an acceleration sensor, which detects triaxial acceleration, for example, and an angular velocity sensor, which detects uniaxial angular velocity, and detected values from the respective sensors are transmitted to the console main unit 10 from the USB communication module 88 or the BT communication module 89. The console main unit 10 detects whether or not the detected value of the tilting sensor 92 transmitted by the controller 20 has changed, and in the case that it has changed, it determines that orientation of the controller 20 has changed. Note that the tilting sensor 92 is not limited to above-given configuration, and may have another structure such as providing an angular velocity sensor for detecting angular velocity around another axis instead of the acceleration sensor as long as it can detect change in orientation of the controller 20.

[General Structure of Portable Terminal Apparatus]

The portable terminal apparatus 120 is a small information processing unit having a function of a video game console similar to the console main unit 10, and a function as an operation terminal similar to the controller 20. In the same manner as the connection port 121, the wireless communication unit 123, and the controller 20, a right operation part 31 and a left operation part 32, a first right push button 35 and a first left push button 36, and a home button 52 are provided as operation keys on the outer surface of the portable terminal apparatus 120. When the user performs an operation input of an operation key at the time of remote play, the portable terminal apparatus 120 transmits a command signal corresponding to the operated operation key to the console main unit 10.

Moreover, the portable terminal apparatus 120 includes a display panel 124 integrally. The display unit 124 is, for example, a liquid crystal display panel, an organic or inorganic electroluminescence (EL) panel, or the like that the user can see. At the time of remote play, the console main unit 10 also transmits to the portable terminal apparatus 120 an image signal supplied to the monitor device 100. The main CPU (omitted from the drawings) of the portable terminal apparatus 120 displays on the display panel 124 an image based on the image signal received from the console main unit 10. Namely, at the time of remote play, the same image as displayed on the monitor device 100 is displayed on the display panel 124, and the user performs operation input to the console main unit 10 by operating the operation keys of the portable terminal apparatus 120 while looking at display on the display panel 124.

[Description of Power-Saving Mode Setting Process]

The main CPU 64 of the console main unit 10 executes power-saving mode setting process in conformity with a power-saving mode setting program stored in the main memory 65. Note that since input operation by the user with the controller 20 and the portable terminal apparatus 120 are the same, the following description is about the case of using the controller 120 and omits description of case of using the portable terminal apparatus 120. Moreover, since the display control target for the console main unit 10 is the monitor device 100, and the operation input target for the user is the controller 20, description of the respective operation targets shall be appropriately omitted from the description.

Setting of power-saving mode is started by the user inputting a power-saving mode setting instruction to the controller 20. More specifically, the user performs a predetermined input operation to the controller 20 to display a menu screen on the monitor device 100, and selects and decides on an entry (icon) written 'power-saving setting' in the menu. The console main unit 10 which has received a signal corresponding to this decision input displays entries of 'main unit automatic power-off' and 'controller automatic power-off'. When the user performs a predetermined input operation to the controller 20 to select and decide on the entry written 'main unit automatic power-off', the main CPU 64 of the console main unit 10 having received the corresponding input operation begins the power-saving mode setting process.

Once the power-saving mode setting process begins, the console main unit 10 arranges entries of '1 hour', '2 hours', '3 hours', and '4 hours' indicating four stages of standby time, and entry of 'switch off' indicating change to the normal mode. When the user performs a predetermined input operation to select and decide on any one of the entries of '1 hour', '2 hours', '3 hours', or '4 hours' (entry other than 'switch off'), the console main unit 10 having received a signal corresponding to the input operation stores a standby time (standby time selected by the user) corresponding to the received signal in the standby time storage region of the main memory 65, and displays a checkbox and a decision icon for setting the second power-saving mode. A text, such as 'shut down power automatically even if some functions are operating', for example, reporting that it is a checkbox for setting the second power-saving mode is displayed near the checkbox. In addition, 'OK', for example, is displayed near the decision icon.

When the user performs predetermined input operations to select and decide on the checkbox and then select and decide on the decision icon, the console main unit 10 having received signals corresponding to these decision inputs stores mode type information indicating the second power-saving mode in the mode type storage region of the main memory 65, and concludes this process. On the other hand, when the user performs the predetermined input operation to select and decide on the decision icon without selecting the checkbox, the console main unit 10 having received a signal corresponding to this decision input stores mode type information indicating the first power-saving mode in the mode type storage region of the main memory 65, and concludes this process.

Alternatively, when the user performs a predetermined input operation to select and decide on the entry of 'switch off' when five entries of '1 hour', '2 hours', '3 hours', '4 hours', and '5 hours' are displayed, the console main unit 10 having received a signal corresponding to this decision input deletes (clears) the mode type information stored in the mode type storage region of the main memory 65, and concludes this process.

Note that initial setting (default setting) is the normal mode, and no mode type information is stored in the mode type storage region.

[Description of Correspondences of Internal Processing, Power-Saving Mode Types, and Conditions for Switching to Power-Off]

Correspondences of internal processing, types of power-saving mode, and conditions for switching to power-off are described with reference to FIG. 6. FIG. 6 is a table showing correspondences of each internal processing executed by the console main unit 10, set types of power saving modes (first power-saving mode and second power-saving mode), power status, which is set when a predetermined time has elapsed without the timer cancellation requirements generating even once during power-on (power-on continuation or power-off continuation). Note that these correspondences are pre-included in the power-saving management program. Moreover, in the following description, numbers within parentheses are those given in FIG. 6.

In the power-saving modes, the respective various types of internal processing executed by the console main unit 10 are classified into a first through a third group (basic groups) and a fourth group including the other processing.

The first group includes internal processing which has little possibility of a defect occurring with the console main unit 10, and which may cause little decrease in convenience for the user even if it is switched over to power-off when a predetermined time has elapsed without the timer cancellation requirements generating even once during power-on. More specifically, the first group includes (6) during sole standby for video chat, (7) during pause of video/music/slideshow, (8) during single photo display, (9) during browser execution, and (10) during background download. Note that the reason why (10) 'during background download' is included in this group is because when the console main unit 10 is switched over from power-on to power-off in the middle of downloading, the downloading is temporarily interrupted, and is restarted upon reactivation of the console main unit 10, and thus convenience for the user does not decrease remarkably.

The second group includes internal processing which has little possibility of a defect occurring with the console main unit 10 even if it is switched over to power-off, but convenience for the user decreases. More specifically, the second group includes (1) during game application execution, (2) during video/music/slideshow playback, (3) during video chat, (4) while printing, and (5) during standby for remote play. Note that (5) 'during standby for remote play' is a state in which the console main unit 10 is set capable of receiving a connection request signal for remote play from the portable terminal apparatus 120, and is state in which the other types of internal processing (any of the processing (1) to (4) and (6) to (14)) are not executed yet through remote play. The reason why the 'during standby for remote play' belongs to this group is because some type of relay units 130 do not transmit to the console main unit 10 an activation request signal for switching over the console main unit 10 from power-off to power-on even if the portable terminal apparatus 120 transmits the activation request signal, and if such type of a relay unit 130 is connected to the console main unit 10 and when the console main unit 10 is switched over from power-on to power-off through remote play, activation of the console main unit 10 through remote play is no longer possible, resulting in lack of convenience for the user performing remote play away from the building.

The third group includes internal processing which has high possibility of a defect occurring with the console main unit 10 or convenience for the user decreases remarkably when it is switched over to power-off. More specifically, (11) during foreground download, (12) while installing/updating, (13) while copying/deleting, (14) while formatting/backing up/restoring, and (15) while broadcast program recording belong to this group. Note that the reason why (11) during foreground download belongs to this group is because once the console main unit 10 is switched over from power-on to power-off in the middle of downloading, the downloading is ended in the middle, and is not restarted even if the console main unit 10 is reactivated. Moreover, the reason why (15) while broadcast program recording belongs to this group is because when recording a program having a longer broadcast time than the standby time, switching over to power-off during recording is remarkably inconvenient for the user.

In the first power-saving mode, when a predetermined period (standby time stored in the standby time storage region) has elapsed without timer cancellation requirements occurring even once during power-on, and if the internal processing of the first group is in execution, power-on is switched over to power-off. Meanwhile, if the internal processing of the second and the third group is in execution, power-on is maintained.

In the second power-saving mode, when a predetermined period has elapsed without timer cancellation requirements occurring even once during power-on, and if the internal processing of the first and the second group is in execution, power-on is switched over to power-off. Meanwhile, if the internal processing of the third group is in execution, power-on is maintained.

Moreover, (16) during remote play execution belongs to the fourth group. During remote play execution in the first power-saving mode, when a predetermined period has elapsed without timer cancellation requirements occurring even once during power-on, power-on is maintained for the same reason as (5) during standby for remote play. Meanwhile, during remote play execution in the second power-saving mode, whether to maintain power-on or switch over to power-off is determined in accordance with the internal processing (aforementioned (1) to (15)) being executed by the console main unit 10 through remote play. In other words, power-on is switched over to power-off in the cases of (1) to (10), and power-on is maintained in the cases of (11) to (15).

[Description of Timer Cancellation Requirements]

Timer cancellation requirements are requirements for clearing (clear time kept until then and restart keeping time from zero) an internal timer that is always keeping time when the console main unit 10 is executing power-saving management processing, and contents thereof are given in FIG. 7. Note that (1) to (5) given below of these timer cancellation requirements are pre-included in the power-saving management program. Moreover, in the following description, numbers within parentheses are those given in FIG. 7.

As shown in FIG. 7, the timer cancellation requirements are (1) reception of a command signal corresponding to any of the operation keys 87 from the controller 20, (2) change in detected value from the tilt sensor 84, (3) reception of a command signal from the keyboard/mouse, (4) detection of operation of the eject button of an external medium, (5) detection of insertion of an external medium, and (6) in the first power-saving mode or the second power-saving mode, continuation of power-on even if a predetermined time has elapsed without the timer cancellation requirements (1) to (5) occurring even once while the power is on. The requirements (1) to (3) are for when the user has operated an operation terminal while the requirements (4) and (5) are for when the user directly operates the console main unit 10. Note that (1) includes reception of a command signal corresponding to any one of the operation keys from the portable terminal apparatus 120. In addition, (1) includes when rotation angle signals and tilting angle signals received from the rotational operation parts have changed.

[Description of Power-Saving Management Processing]

The main CPU 64 of the console main unit 10 executes power-saving management processing in conformity with a power-saving management program stored in the main memory 65. The power-saving management processing is executed both during power-off and power-on.

FIG. 8 is a flowchart showing power-saving management processing executed by the main CPU 64. The power-saving management processing begins when the console main unit 10 changes to a power-saving mode, and it is executed repeatedly at every predetermined time during power-on.

When the power-saving management processing begins, begin time keeping by the internal timer, and determine whether the timer cancellation requirements have occurred (step S1). If the timer cancellation requirements have not occurred (No in step S1), determine whether the time keeping of the internal timer has elapsed the predetermined time (set standby time) (step S2). Otherwise if the predetermined time has not been reached yet (No in step S2), conclude this processing. In other words, power-on is maintained until the state where the user is not operating either an operation terminal or the console main unit 10 for at least the stored standby time.

If the time keeping of the internal timer reaches the predetermined time (Yes in step S2), determine whether the conditions for switching over to power-off are satisfied (step S3) according to set type of power-saving mode, each internal processing executed by the console main unit 10, and the correspondences in FIG. 6. If it is determined that the conditions for switching over to power-off are satisfied (Yes in step S3), switch over to power-off (step S4), and conclude this processing.

If it is determined that the conditions for switching over to power-off are not satisfied in the processing of step S3 (No in step S3), reset the internal timer, clear the time kept until then, restart keeping time from zero, and conclude the processing.

For example, in the case where the console main unit 10 is executing a game application (the internal processing (1) in FIG. 6), the stored standby time is one hour, and the set power-saving mode is the second power-saving mode, and if the state where the user is not operating either the operation terminal or the console main unit 10 continues for at least one hour, the main CPU 64 switches the console main unit 10 over to power-off. On the other hand, in the case where the console main unit 10 is executing a game application (the internal processing (1) in FIG. 6), the stored standby time is one hour, and the set power-saving mode is the first power-saving mode, and even if the state where the user is not operating either the operation terminal or the console main unit 10 continues for at least one hour, the main CPU 64 keeps the console main unit 10 in power-on.

Moreover, if the timer cancellation requirements have occurred (Yes in step S1), reset the internal timer (step S6), clear the time kept until then, restart keeping time from zero, and conclude the processing.

As described above, according to the present invention, each user may set the console main unit 10 to a desired power-saving mode by a simple operation input, thereby allowing execution of auto power-off on demand by individual users.

Note that with this embodiment, while types and contents of each power-saving mode are preset as shown in FIG. 6, a structure allowing types and contents (correspondences) to be appropriately changed by a user's operation input may be used.

The descriptions of the respective embodiments given above are merely examples. Therefore, the present invention is not limited to the respective embodiments given above, and it is needless to say that various changes may be made without departing from the spirit or scope of the present invention.

[Industrial Applicability]

Various embodiments of the present invention are widely applicable to various uses, devices, apparatuses, systems, methods, applications, etc., including information processing units having an auto power-off function.

What is claimed is:

1. An information processing unit having an auto power-off function, comprising:
   a mode setting means for setting one mode from a plurality of pre-prepared power-saving modes in conformity with input by a user, wherein the plurality of power-saving modes includes a first mode and a second mode, and the first mode and the second mode differ in electricity consumption reduction effectiveness;
   a determination means for determining whether a non-operated state in which no input operation has been carried out by the user has continued for a predetermined time or longer;
   a processing execution means for executing internal processing; and
   a decision means for deciding whether or not to execute the auto power-off function based on the mode set by the mode setting means and internal processing executed by the processing execution means when the determination means has determined that the non-operated state has continued for a predetermined time or longer, wherein
   the decision means decides not to execute the auto power-off function when the mode setting means sets the first mode and the determination means has determined that the non-operated state has continued for a predetermined time or longer while the processing execution means is executing predetermined internal processing,
   the decision means decides to execute the auto power-off function when the mode setting means sets the second mode and the determination means has determined that the non-operated state has continued for the predetermined time or longer while the processing execution means is executing the predetermined internal processing,
   the predetermined internal processing is game application execution and video replay;
   wherein the internal processing executed by the processing execution means is classified into a first group, a second group, and a third group;
   when the determination means has determined that the non-operated state has continued for the predetermined time or longer while the processing execution means is executing internal processing belonging to the first group, the decision means decides to execute the auto power-off function even in the case where the mode setting means sets either one of the first mode or the second mode;
   when the determination means has determined that the non-operated state has continued for the predetermined time or longer while the processing execution means is executing internal processing belonging to the second group, the decision means decides not to execute the auto power-off function in the case where the mode setting means sets the first mode whereas the decision means decides to execute the auto power-off function in the case where the mode setting means sets the second mode; and
   when the determination means has determined that the non-operated state has continued for the predetermined time or longer while the processing execution means is executing internal processing belonging to the third group, the decision means decides not to execute the auto power-off function even in the case where the mode setting means sets either one of the first mode or the second mode.

2. The information processing unit of claim 1, wherein the first mode and the second mode differ from each other in electricity consumption reduction effectiveness.

3. An information processing unit having an auto power-off function, comprising:
   a mode setting means for setting one mode from a plurality of pre-prepared power-saving modes in conformity with input by a user, wherein the plurality of power-saving modes includes a first mode and a second mode, and the first mode and the second mode differ in electricity consumption reduction effectiveness;
   a determination means for determining whether a non-operated state in which no input operation has been carried out by the user has continued for a predetermined time or longer;
   a processing execution means for executing internal processing; and
   a decision means for deciding whether or not to execute the auto power-off function based on the mode set by the mode setting means and internal processing executed by the processing execution means when the determination means has determined that the non-operated state has continued for a predetermined time or longer, wherein
   the internal processing executed by the processing execution means is classified into a first group, a second group, and a third group;
   when the determination means has determined that the non-operated state has continued for the predetermined time or longer while the processing execution means is executing internal processing belonging to the first group, the decision means decides to execute the auto power-off function even in the case where the mode setting means sets either one of the first mode or the second mode;
   when the determination means has determined that the non-operated state has continued for the predetermined time or longer while the processing execution means is executing internal processing belonging to the second group, the decision means decides not to execute the auto power-off function in the case where the mode setting means sets the first mode whereas the decision means decides to execute the auto power-off function in the case where the mode setting means sets the second mode; and when the determination means has determined that the non-operated state has continued for the predetermined time or longer while the processing execution means is executing internal processing belonging to the third group, the decision means decides not to execute the auto power-off function even in the case where the mode setting means sets either one of the first mode or the second mode.

4. A non-transitory storage medium storing a computer program for power-saving management, wherein the computer program allows a computer to execute:
   a mode setting step of setting one mode from a plurality of pre-prepared power-saving modes in conformity with input by a user, wherein the plurality of power-saving modes includes a first mode and a second mode, and the first mode and the second mode differ in electricity consumption reduction effectiveness;
   a determination step of determining whether a non-operated state in which no input operation has been carried out by the user has continued for a predetermined time or longer;
   a processing execution step of executing internal processing; and
   a decision step for deciding whether or not to execute an auto power-off function based on the mode set in the mode setting step and internal processing executed in the processing execution step when the non-operated state is determined in the determination step to have continued for a predetermined time or longer, wherein
   it is decided in the decision step not to execute the auto power-off function when the first mode is set and it is determined that the non-operated state has continued for a predetermined time or longer while executing the predetermined internal processing,
   it is decided in the decision step to execute the auto power-off function when the second mode is set and it is determined that the non-operated state has continued for the predetermined time or longer while the executing the predetermined internal processing,
   the predetermined internal processing is game application execution and video replay;
   wherein the internal processing executed in the processing execution step is classified into a first group, a second group, and a third group;
   when it has been determined in the determination step that the non-operated state has continued for the predetermined time or longer while executing the internal processing belonging to the first group in the processing execution step, the decision means decides to execute the auto power-off function even in the case where, in the mode setting step, either one of the first mode or the second mode is set;
   when it has been determined in the determination step that the non-operated state has continued for the predetermined time or longer while executing the internal processing belonging to the second group in the processing execution step, the decision means decides not to execute the auto power-off function in the case where the first mode is set in the mode setting step, whereas the decision means decides to execute the auto power-off function in the case where the second mode is set in the mode setting step; and
   when it has been determined in the determination step that the non-operated state has continued for the predetermined time or longer while executing the internal processing belonging to the third group the processing execution step, the decision means decides not to execute the auto power-off function even in the case where either one of the first mode or the second mode is set in the mode setting step.

5. A power-saving management method, comprising:
   a mode setting step of setting one mode from a plurality of pre-prepared power-saving modes in conformity with input by a user, wherein the plurality of power-saving modes includes a first mode and a second mode, and the first mode and the second mode differ in electricity consumption reduction effectiveness;
   a determination step of determining whether a non-operated state in which no input operation has been carried out by the user has continued for a predetermined time or longer;
   a processing execution step of executing internal processing; and
   a decision step for deciding whether or not to execute the auto power-off function based on the mode set in the mode setting step and internal processing executed in the processing execution step when the non-operated state is determined in the determination step to have continued for a predetermined time or longer, wherein
   it is decided in the decision step not to execute the auto power-off function when the first mode is set and it is determined that the non-operated state has continued for a predetermined time or longer while the executing the predetermined internal processing,
   it is decided in the decision step to execute the auto power-off function when the second mode is set and it is determined that the non-operated state has continued for the predetermined time or longer while executing the predetermined internal processing,
   the predetermined internal processing is game application execution and video replay;
   wherein the internal processing executed in the processing execution step is classified into a first group, a second group, and a third group;
   when it has been determined in the determination step that the non-operated state has continued for the predetermined time or longer while executing the internal processing belonging to the first group in the processing execution step, the decision means decides to execute the auto power-off function even in the case where, in the mode setting step, either one of the first mode or the second mode is set;
   when it has been determined in the determination step that the non-operated state has continued for the predetermined time or longer while executing the internal processing belonging to the second group in the processing execution step, the decision means decides not to execute the auto power-off function in the case where the first mode is set in the mode setting step, whereas the decision means decides to execute the auto power-off function in the case where the second mode is set in the mode setting step; and
   when it has been determined in the determination step that the non-operated state has continued for the predetermined time or longer while executing the internal processing belonging to the third group the processing execution step, the decision means decides not to execute the auto power-off function even in the case where either one of the first mode or the second mode is set in the mode setting step.

6. The information processing unit of claim 3, wherein the first mode and the second mode differ from each other in electricity consumption reduction effectiveness.

* * * * *